United States Patent [19]

Lunn et al.

[11] 4,097,625

[45] Jun. 27, 1978

[54] LOW MELTING TEMPERATURE METAL COATING PROCESS, APPARATUS AND PRODUCT

[75] Inventors: Norman Laurence Lunn, Beaver; Charles Jeffrey McCrea, New Galilee, both of Pa.; Raymond David Pregaman, Norcross, Ga.; Lawrence Edward Turowski, New Kensington, Pa.

[73] Assignee: St. Joe Minerals Corporation, New York, N.Y.

[21] Appl. No.: 807,661

[22] Filed: Jun. 17, 1977

Related U.S. Application Data

[63] Continuation of Ser. No. 511,203, Oct. 2, 1974, abandoned, which is a continuation-in-part of Ser. No. 433,523, Jan. 15, 1974, abandoned.

[51] Int. Cl.² .......................... C23C 7/00; B44D 1/44; B32B 35/00; B37B 31/00
[52] U.S. Cl. ...................................... 427/360; 118/59; 118/108; 118/415; 156/247; 427/361; 427/365; 427/367
[58] Field of Search .................. 118/59, 108, 415; 156/247; 427/360, 361, 365, 367

[56] References Cited

U.S. PATENT DOCUMENTS

| | | | |
|---|---|---|---|
| 2,101,854 | 12/1937 | Haunz | 427/367 X |
| 3,055,768 | 9/1962 | Lassiter | 426/367 X |
| 3,086,879 | 4/1963 | Lassiter | 427/367 X |
| 3,244,553 | 4/1966 | Knapp et al. | 427/404 X |
| 3,452,807 | 7/1969 | Braun | 114/275 |
| 3,579,412 | 5/1971 | Paine | 427/367 X |
| 3,775,156 | 11/1973 | Singer | 118/302 X |
| 3,804,689 | 4/1974 | O'Connor | 156/233 |

FOREIGN PATENT DOCUMENTS 2,648 of 1912 United Kingdom ................ 427/367

Primary Examiner—Michael R. Lusignan
Attorney, Agent, or Firm—Harold L. Stowell

[57] ABSTRACT

Substrate such as relatively porous, low thermally conductive materials are coated with molten lead, lead-base alloys, zinc, zinc-base alloys, tin, tin-base alloys, cadmium, cadmium-base alloys, aluminum, aluminum-base alloys and the like by spreading the molten metal by means of a low thermally conductive roll to provide products useful in sound attenuation, moisture and corrosion proofing and radiation shielding.

6 Claims, 5 Drawing Figures

LOW MELTING TEMPERATURE METAL COATING PROCESS, APPARATUS AND PRODUCT

This is a continuation of application Ser. No. 511,203, filed Oct. 2, 1974, now abandoned, which is a continuation-in-part of application Ser. No. 433,523, filed Jan. 15, 1974, now abandoned.

BACKGROUND OF THE INVENTION

In our prior application Ser. No. 433,523, it was disclosed that environmental and medical concerns about the potential hazards of noise pollution had spurred the development of sound attenuating construction and repair materials. Because of its high density and good damping characteristics, lead possesses excellent sound attenuating properties. Therefore, an economical method for applying lead coatings was developed. The lead coating imparts the required sound attenuating properties as well as providing moisture and corrosion protection and radiation shielding.

It has now been found that such process and apparatus can be used to coat substrates with other relatively low temperature melting metals and metal alloys such as zinc, zinc-base alloys, tin, tin-base alloys, cadmium, cadmium-base alloys, aluminum, aluminum-base alloys and the like.

OBJECTS OF THE INVENTION

It is a principal object of the present invention to provide a method and apparatus for coating substrates such as paper, cloth, screen, ceiling tube, plastic sheeting, wood paneling, gypsum board, and the like with molten lead, lead-base alloys, zinc, zinc-base alloys, tin, tin-base alloys, cadmium, cadmium-base alloys, aluminum, aluminum-base alloys and the like to provide improved lead or lead alloys, zinc, zinc-base alloys, tin or tin-base alloys, cadmium or cadmium-base alloys, aluminum or aluminum-base alloys, coated paper, wall board, tiles, wood, cloth, plastic, and the like construction materials and products.

It is a further object to provide such a method, apparatus and resulting products wherein the molten lead or lead-base alloys, zinc or zinc-base alloys, tin or tin-base alloys, cadmium or cadmium-base alloys and aluminum or aluminum-base alloys are physically pressed into the relatively porous substrate material to thereby provide a substantial mechanical bond between the lead or lead-based alloy, zinc or zinc-base alloys, tin or tin-base alloys, cadmium or cadmium-base alloys, and aluminum or aluminum-base alloys and substrate.

THE INVENTION

The invention is primarily directed to a method of thin-coating substrates selected from the group including paper, cloth, screen, ceiling tile, plastic sheeting, wood paneling, gypsum board and the like, with molten lead or lead-based alloys, zinc or zinc-base alloys, tin or tin-base alloys, cadmium or cadmium-base alloys, and aluminum or aluminum-base alloys by spreading the molten metal by means of a low thermally conductive roll to provide products useful in sound attenuation, moisture and corrosion proofing, radiation shielding and the like.

In one aspect, the invention comprises a method of thin-coating a substrate comprising heating lead or lead-based alloys, zinc or zinc-base alloys, tin or tin-base alloys, cadmium or cadmium-base alloys, and aluminum or aluminum-base alloys to the molten state; dispensing in a continuous rectilinear pattern a stream of the molten metal onto a suitable substrate to be coated and continuously pressing the dispensed metal while molten into the substrate; and apparatus for carrying out the method.

The invention also includes improved building materials formed by such process.

The invention will be more particularly described in reference to the accompanying drawing wherein.

In order to place thin coatings of lead, lead-based alloys, zinc, or zinc-base alloys, tin or tin-base alloys, cadmium or cadmium-base alloys, and aluminum or aluminum-base alloys on, for example, Kraft paper, ceiling tiles and wall boards and the like and to obtain a strong mechanical bond between the substrate and the coating, it has been found necessary to apply the metal in a molten state and while molten to press the applied metal onto the surface of the substrate. Further, it has been found that it is important that the substrate and the pressing applicator have restricted heat transfer capacity to prevent freezing of the molten metal prior to the time that the molten metal has been pressed onto and into the substrate. Prevention of freezing or restricting heat transfer can be achieved by either choosing substrates and/or applicator materials with low thermal conductivities and/or by sufficiently preheating the substrate and/or the applicator to temperatures near the melting point or liquidus temperature of the coating metal or alloy.

Figure 1:
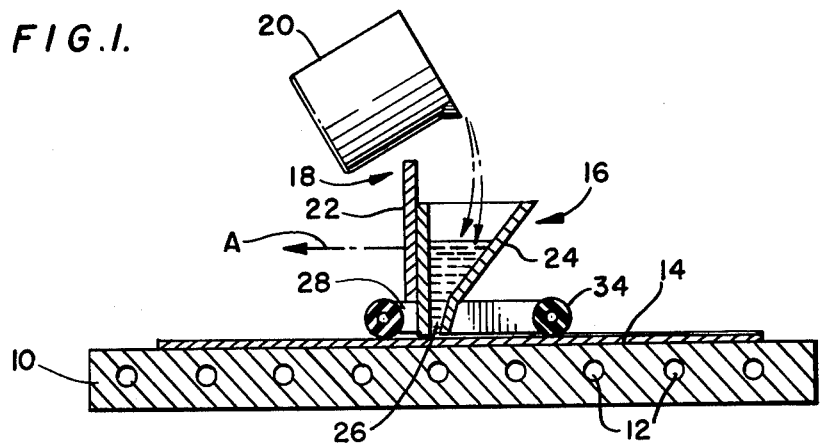
FIG. 1 is a diagrammatic view of apparatus suitable for carrying out the present invention.
Figure 2:
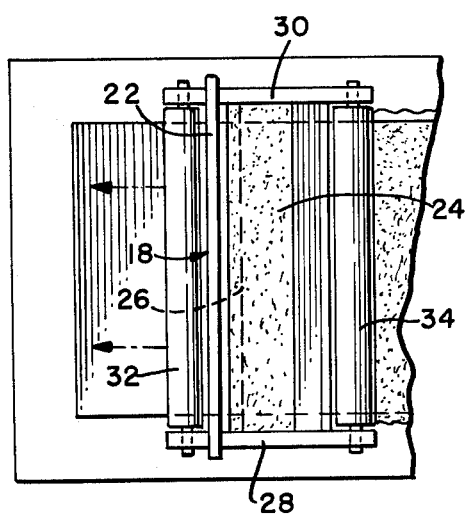
FIG. 2 is a top plan view of the structures shown in FIG. 1.

Referring now particularly to FIGS. 1 and 2 of the drawings, 10 generally designates a support which may include means for maintaining the support at a predetermined temperature slightly below the melting temperature of the metal or alloy coating material. The heating means may include electrical coils 12 embedded in the support and connected to a suitable controlled source of electric current not shown. On the support is a fiberboard 14 to be coated while 16 generally designates a suitable form of coating or dispensing apparatus.

The dispenser 16 includes a reservoir 18 constructed of a refractory-asbestos material so that the molten metal from a source generally designated 20 will not rapidly lose heat and freeze in the reservoir or immediately after being dispensed. The end walls 22 and 24 of the reservoir 18 are mounted so that at the lower dispensing end there is an opening or dispensing gap 26. With the gap from about ⅛ to about ½ inch in width very satisfactory dispensing of, for example, lead and lead-based alloys has been obtained. The reservoir 18 is supported adjacent its lower end by cross arms 28 and 30 which rotatably support a front roller 32 and a rear roller 34. The rollers are larger in length than the width of the sheet material to be coated and provide the rolling support means for the dispenser in its movement along the sheet or substrate 14 in the direction of the directional arrow A.

The rear roller 34, which comes in contact with the pool of liquid metal dispensed through the opening 26, is also made of a low heat transfer material to reduce freezing of the liquid metal until it has been rolled and pressed onto the surface of the material to be coated, during the single pass of the dispenser over the sheet material.

Figure 3:
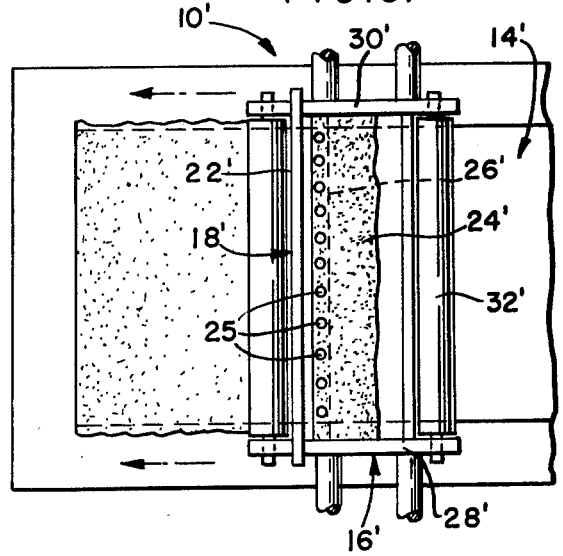
FIG. 3 is a view like FIG. 2 of a modified form of the invention.

Referring now particularly to FIG. 3 of the drawings, a modified form of the invention is shown wherein 10' generally designates a support which may comprise an endless carrier movable in the direction of the directional arrows and which may include means for maintaining the movable support at a predetermined temperature slightly below the melting or liquidus temperature of the metal or metal alloy coating material. The movable support carries therewith Kraft paper 14' to be coated while 16' generally designates a suitable form of coating or dispensing apparatus.

The dispenser 16' includes a stationary reservoir 18' constructed of a refractory-asbestos material so that the molten metal from a source will not rapidly lose heat and freeze in the reservoir or immediately after being dispensed. The side walls 22' and 24' of the reservoir 18' are separated at their lower dispensing ends by a dispensing floor 26' consisting of a plate having a series of holes 25 therethrough about ¼ inch in diameter and for example about 1 inch apart along the width thereof when used for lead and lead-base alloy coatings. At the lower end of the reservoir 18' are mounted cross arms 28' and 30' which rotatably support a first roller 34' and a second roller 32'. The rollers are larger in length than the width of the sheet material to be coated and provide the rolling contact between the fixed dispenser and the movable support 10'.

The first roller 34', which comes in contact with the pool of liquid metal dispensed through the plural openings 25, is also made of a low heat transfer material to reduce freezing of the liquid metal until it has been rolled and pressed onto the surface of the material to be coated, during the single pass of the sheet material under the dispenser.

Very satisfactory results are obtained when the rollers 34 or 34' are constructed of hard rubber, however, other materials with low thermal conductivity such as ceramics may also be employed. Further, it will be appreciated by those skilled in the art that where a continuous operational coating device is employed, cooling means, for the rear roller, may be employed such as small jets of air placed in contact with the upper surface of the roll or by the circulation of a cooling medium through the center of the roller. Further, with apparatus such as is shown in FIGS. 1 and 2, the weight or mass of the molten metal in the reservoir 18 provides roll pressure sufficiently great to force the molten metal into the pores of the substrate to be coated.

Figure 4:
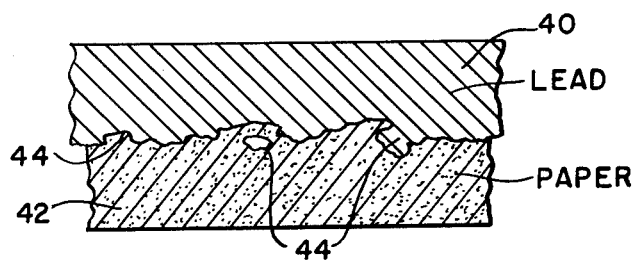
FIG. 4 is an enlarged diagrammatic view of a coated paper manufactured in accordance with the teachings of the present invention.

The lead or lead-based alloys, zinc or zinc-base alloys, tin or tin-base alloys, cadium or cadmium-base alloys, and aluminum or aluminum-base alloys coating 40, FIG. 4 of the drawings, is mechanically fastened to the substrate 42, which in the illustrated form of the invention comprises a sheet of Kraft paper, during the coating process. The molten metal is forced into the pores of the substrate by the pressure exerted by the rolls 34 or 34' and as shown in the diagrammatic illustration, FIG. 4, after solidification the coating is mechanically bonded to the substrate via the metal fingers illustrated at 44 which penetrates into the pores of the substrate.

Figure 5:
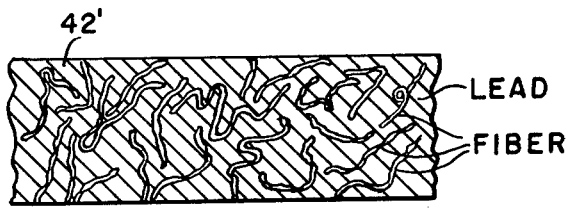
FIG. 5 is a view similar to that shown in FIG. 4 of another product manufactured in accordance with the teachings of the present invention.

In FIG. 5 of the drawings the substrate comprises a fibrous ceiling tile and it will be noted that the metal 40 is forced deeply into the pores of the tile.

It has been found that there are at least four factors which influence the bonding mechanism between the substrate and the metal thus affecting coating adherence:
1. Roll pressure
2. Substrate porosity
3. Molten metal viscosity
4. Strength of the solidified metal The first three items are important in controlling the flow of molten metal into the pores of the substrate. The roll pressure must be sufficiently great to force the molten metal into the pores of the substrate. Likewise, the melt must have sufficient viscosity to permit it to flow into the pores. Molten metal flow into the pores will increase as substrate porosity increases. The last item (i.e., alloy strength) is important in determining coating adherence because the stronger the solidified "fingers", 44, FIG. 4, are the more tenaciously the coating adheres to the substrate.

In respect to roll pressure, tests have shown that a dispenser of the type shown in FIGS. 1 and 2 having a coating width of 2 feet and a molten metal capacity of 50 pounds of lead and a gross weight of about 100 pounds effectively forced the molten metal into the pores of Kraft paper, fibrous ceiling tiles, fiberglass sheets and the like.

Molten metal viscosity can be lowered to increase penetration of the metal into the substrate either by raising the melt temperature or by alloying the metal with elements such as antimony in the case of lead, which lower molten metal viscosity. The optimum molten metal temperature is influenced by the substrate and coating alloy composition. For smooth uniform coatings, the melt temperature must at least exceed the liquidus temperature of the alloy. However, it must not be too high or the substrate may be charred. In tests it has been found that the melt temperatures in the range of about 650°–1250° F have given good results.

In some instances a weak bond between coating and substrate may be desirable. For example, it is possible to use this hot melt coating process to produce thin metal sheets. A thin coating is applied to an appropriate substrate such as paper and a weak bond is intentionally produced. The coating is then stripped off and used as thin sheet material.

In direct contrast to a weak bond between coating and substrate, a total bond may be desired. The term "total bond" is used herein to describe a complete encapsulation of the substrate by the coating such as illustrated in FIG. 5. Because this process can be adapted to totally encapsulate a substrate, it provides an opportunity to economically produce composite materials.

PRODUCTS

Table I summarizes the types and characteristics of products which have been successfully produced using lead and lead-based alloys:

TABLE I

| Product | Alloys Investigated (% by Weight) | Most Suitable Alloys | Capabilities Using Present Equipment |
|---|---|---|---|
| Pb-coated ceiling | Doe Run Pb* Pb - 6% Sb | Anti- | 2' × 4' tiles |

TABLE I-continued

| Product | Alloys Investigated (% by Weight) | Most Suitable Alloys | Capabilities Using Present Equipment |
|---|---|---|---|
| tile and wallboard | Pb - 3% Sb<br>Pb - 0.08% Ca - 1.0% Sn | monial Alloys | (max,) with 0.25 lb/f² Pb coating |
| Pb-coated paper | Pb - 6% Sb<br>Pb - 3% Sb<br>Doe Run Pb*<br>Pb - 0.08% Ca - 1.0% Sn | Antimonial | 2' × 4' sheets Kraft paper substrate with 0.003" (min.) Pb coating |
| Thin cast Pb Sheets | Doe Run Pb*<br>Pb - 6% Sb<br>Pb - 3% Sb<br>Pb - 0.08% Ca - 1.0% Sn<br>Pb - 0.09% Li - 0.04% Ca - 1.0% Sn | All | 2' × 4' sheets 0.004" (min.) thickness |

*St. Joe Minerals Corporation brand corroding grade lead.

Table II comprises a listing of coatings, substrates, and coating temperatures which have been successfully produced using the teachings of the invention:

TABLE II

| Metal or Alloy | Bath Temperature | Substrate |
|---|---|---|
| A. Lead | 670 - 900° F | 1. Paper<br>  a. Unglazed book<br>  b. Kraft<br>  c. Butcher<br>  d. Hand towels<br>2. Cloth<br>  a. Cotton<br>  b. 80% dacron-20% cotton<br>  c. 50% polyester-50% rayon<br>  d. 90% synthetic-10% silk<br>  e. Burlap<br>  f. Fiberglass- close weave to ¼" openings<br>3. Metal Screen<br>  a. Carbon steel<br>  b. Stainless steel<br>4. Ceiling Tile<br>5. Polypropylene Sheet<br>6. Wood Paneling<br>7. Gypsum Board |
| B. Lead-Antimony (1-6%) | 670 - 900° F | 1. Paper<br>  a. Unglazed book<br>  b. Kraft<br>  c. Butcher<br>  d. Hand towels<br>2. Cloth<br>  a. Cotton<br>  b. Burlap<br>3. Ceiling Tile<br>4. Gypsum Board |
| C. Pb-Ca(0.08%)-Sn(0.1%) | 670 - 900° F | 1. Paper<br>  a. Unglazed book<br>  b. Kraft |
| D. Zinc | 850° F | 1. Paper<br>  a. Unglazed book<br>  b. Kraft<br>2. Cloth<br>  a. Cotton<br>  b. Fiberglass |
| E. Zn-Al(22%) | 975° F | 1. Paper<br>  a. Unglazed book<br>  b. Kraft<br>2. Cloth<br>  a. Cotton<br>  b. Fiberglass |
| F. Zn-Al(7%)-Cu(3.3%) | 775° F | 1. Paper<br>  a. Unglazed book<br>  b. Kraft<br>2. Cloth<br>  a. Cotton<br>  b. Fiberglass |
| G. Aluminum | 1250° F | 1. Cloth<br>  a. Fiberglass |

We claim:

1. A method of mechanically bonding to a non-metallic porous substrate a metal selected from the group consisting of lead or lead-base alloys, zinc or zinc-base alloys, tin or tin-base alloys, cadmium or cadmium-base alloys, and aluminum or aluminum-base alloys, comprising heating said selected metal to its molten state; supporting a non-metallic porous substrate on a heat sink; while supported dispensing in a continuous rectilinear pattern a stream of the molten metal on the supported non-metallic porous substrate to be coated; continuously pressing the dispensed metal while still molten into the substrate and causing said dispensed metal to solidify immediately following the pressing step.

2. Paper, cloth, wallboard tile, wood, gypsum board, plastic sheet, or screen coated by the process of claim 1.

3. The method defined in claim 1 further including stripping the solidified metal from the substrate.

4. Apparatus for mechanically bonding to a non-metallic porous substrate comprising means for heating a low temperature metal to its molten state; heat sink means for supporting the non-metallic substrate; means for dispensing in a continuous rectilinear pattern a stream of the molten metal on said substrate while supported; and means for continuously pressing the dispensed metal while still molten into the substrate and means maintaining the substrate at a temperature such that the dispensed metal immediately solidifies after it is pressed into the substrate.

5. Apparatus as defined in claim 4 wherein the means for continuously pressing the dispensed metal into the substrate comprises a roller.

6. The invention defined in claim 5 wherein the roller comprises rubber.

* * * * *